US011044893B2

(12) United States Patent
Wendling

(10) Patent No.: US 11,044,893 B2
(45) Date of Patent: Jun. 29, 2021

(54) BAFFLE ASSEMBLY FOR POLE

(71) Applicant: Allan Wendling, New Lothrop, MI (US)

(72) Inventor: Allan Wendling, New Lothrop, MI (US)

( * ) Notice: Subject to any disclaimer, the term of this patent is extended or adjusted under 35 U.S.C. 154(b) by 273 days.

(21) Appl. No.: 16/382,780

(22) Filed: Apr. 12, 2019

(65) Prior Publication Data

US 2020/0323174 A1    Oct. 15, 2020

(51) Int. Cl.
*A01K 39/01* (2006.01)
*G09F 7/18* (2006.01)

(52) U.S. Cl.
CPC ............ *A01K 39/0113* (2013.01); *G09F 7/18* (2013.01); *G09F 2007/1804* (2013.01)

(58) Field of Classification Search
CPC ............ A01K 39/0113; A01K 119/057; A01G 17/04; G09F 7/18; G09F 2007/1804; G09F 2007/1817; G09F 2007/1808; G09F 2007/1813
USPC ...................................................... 40/60, 617
See application file for complete search history.

(56) References Cited

U.S. PATENT DOCUMENTS

| | | | | |
|---|---|---|---|---|
| 1,641,081 A | * | 8/1927 | Heymann | ................ B63B 21/12 114/221 R |
| 1,879,813 A | | 9/1932 | Molitor | |
| 1,994,101 A | * | 3/1935 | Hawkins | ................. A01M 1/18 43/108 |
| 2,417,741 A | * | 3/1947 | Dillon | ...................... F16L 17/04 285/373 |
| 2,483,874 A | * | 10/1949 | Bernhard | ................ B63B 21/12 114/221 R |
| 2,513,141 A | * | 6/1950 | Carder | .................... B63B 21/12 114/221 R |
| 2,525,234 A | * | 10/1950 | Mucke | .................... B63B 21/12 114/221 R |
| 2,651,094 A | | 9/1953 | Dodge | |
| 2,663,531 A | | 12/1953 | Rubano | |
| 2,706,023 A | | 4/1955 | Merritt | |
| 2,755,054 A | | 7/1956 | Churella | |
| 2,855,167 A | | 10/1958 | Christopherson | |
| 2,977,995 A | | 4/1961 | Walpole | |

(Continued)

FOREIGN PATENT DOCUMENTS

GB        2367230 A    4/2002

*Primary Examiner* — Tien Q Dinh
*Assistant Examiner* — Zoe Tam Tran
(74) *Attorney, Agent, or Firm* — Dinsmore & Shohl, LLP

(57) ABSTRACT

A baffle assembly for a pole includes a clamping structure adapted to be positioned about a pole. The clamping structure includes a plurality of laterally spaced mounting hooks removably joined along the longitudinal axis. The plurality of laterally spaced mounting hooks extends from a proximal end to a distal end defining a length of the clamping structure. A mounting strap includes a first end attached to the proximal end of the plurality of laterally spaced mounting hooks. The mounting strap extends to a second end and includes a fastener formed thereon. Bell housing includes opposing open ends. The bell housing is positioned about the pole and about the clamping structure wherein the bell housing is supported by the mounting hooks. The length of the clamping structure is adjusted by removal of selected mounting hooks of the plurality of laterally spaced mounting hooks from the distal end.

20 Claims, 7 Drawing Sheets

(56) References Cited

U.S. PATENT DOCUMENTS

| | | | |
|---|---|---|---|
| 3,241,800 A | 3/1966 | Richter | |
| 3,785,604 A * | 1/1974 | Steck | F16M 13/022 248/230.8 |
| 4,031,856 A * | 6/1977 | Chester | A01K 39/0113 119/57.9 |
| 4,635,888 A | 1/1987 | Aldridge et al. | |
| 4,637,164 A * | 1/1987 | Brown | A01G 13/105 43/106 |
| 4,759,521 A | 7/1988 | Aldridge et al. | |
| 4,765,277 A * | 8/1988 | Bailey | A01K 39/012 119/428 |
| 4,819,846 A * | 4/1989 | Hannemann | A45F 5/00 2/312 |
| 5,008,987 A | 4/1991 | Armour, II | |
| 5,152,443 A * | 10/1992 | Hagan | A41F 9/002 224/148.4 |
| 5,191,857 A * | 3/1993 | Boaz | A01K 39/0113 119/52.3 |
| 5,289,619 A | 3/1994 | Pileggi | |
| 5,289,796 A * | 3/1994 | Armstrong | A01K 39/012 119/52.3 |
| 5,291,855 A * | 3/1994 | Laverty | A01K 39/0113 119/52.3 |
| 5,310,151 A | 5/1994 | Engel | |
| 5,335,889 A | 8/1994 | Hopkins et al. | |
| 5,347,769 A * | 9/1994 | Dinsmore | E01F 9/623 52/101 |
| D356,878 S * | 3/1995 | Thaxter | D30/110 |
| 5,394,641 A * | 3/1995 | Danca | A01K 39/0113 119/52.3 |
| D357,458 S * | 4/1995 | Tisbo | D13/118 |
| 5,570,652 A * | 11/1996 | Ferland | B63B 21/12 114/221 R |
| 5,601,263 A | 2/1997 | Thayer | |
| 5,642,687 A * | 7/1997 | Nylen | A01K 39/0113 119/52.3 |
| 5,782,041 A * | 7/1998 | Filipescu | E04H 12/2292 52/101 |
| 5,826,542 A * | 10/1998 | Allen | H02G 7/00 119/57.9 |
| 5,833,188 A | 11/1998 | Studdiford et al. | |
| 5,867,953 A * | 2/1999 | Amundsen | E02D 27/00 52/170 |
| D409,339 S * | 5/1999 | Silano | H01B 17/00 D30/124 |
| 5,950,359 A * | 9/1999 | Pivnik | A01G 17/04 47/43 |
| 5,966,781 A * | 10/1999 | Geiger | F16L 3/137 24/16 PB |
| 5,966,865 A * | 10/1999 | Jones | A47G 7/044 248/218.4 |
| 6,024,048 A | 2/2000 | Potente | |
| 6,098,348 A * | 8/2000 | Weaver | A01K 39/0113 119/52.3 |
| D440,360 S | 4/2001 | Nylen | |
| D441,505 S | 5/2001 | Nylen | |
| D441,922 S | 5/2001 | Nylen | |
| 6,226,933 B1 | 5/2001 | Nelson et al. | |
| 6,291,774 B1 * | 9/2001 | Williams | H01B 17/00 174/135 |
| D449,719 S | 10/2001 | Nylen | |
| 6,401,658 B1 * | 6/2002 | Teets | A01K 39/00 119/52.2 |
| 6,532,894 B2 | 3/2003 | Johnson | |
| 6,553,726 B1 * | 4/2003 | Roberts | A01G 13/105 47/32.5 |
| 6,588,440 B2 * | 7/2003 | Varnado | A01M 31/025 135/120.1 |
| D480,515 S | 10/2003 | Heyek | |
| 6,843,456 B1 | 1/2005 | Hajianpour | |
| 7,059,572 B2 | 6/2006 | Ware et al. | |
| D538,036 S * | 3/2007 | Buck | D3/224 |
| 7,424,992 B1 | 9/2008 | Dziedzic | |
| 7,540,110 B2 * | 6/2009 | Al-Sulaiman | A63B 21/0605 473/437 |
| 7,574,976 B2 | 8/2009 | Ellen et al. | |
| 7,789,360 B2 | 9/2010 | Qualy et al. | |
| 8,087,560 B2 * | 1/2012 | Crye | A45F 5/02 224/675 |
| 8,141,682 B2 * | 3/2012 | White | B65H 35/0013 224/162 |
| 8,870,138 B2 | 10/2014 | Maguire | |
| D718,522 S * | 12/2014 | Larsen | D3/215 |
| 9,033,197 B2 * | 5/2015 | Bar | B65H 35/0013 224/162 |
| 9,179,761 B2 | 11/2015 | Rambelli | |
| D794,949 S * | 8/2017 | Zimmer | D3/224 |
| 2001/0032593 A1* | 10/2001 | Johnson | A01K 39/0113 119/52.3 |
| 2002/0096611 A1 | 7/2002 | Meuth et al. | |
| 2003/0075652 A1 | 4/2003 | Studdiford et al. | |
| 2003/0130070 A1* | 7/2003 | Nolan | A63B 21/0605 473/437 |
| 2004/0200044 A1 | 10/2004 | Lusardi | |
| 2006/0102083 A1 | 5/2006 | Ellen et al. | |
| 2006/0231706 A1* | 10/2006 | Wyatt | G09F 7/18 248/218.4 |
| 2007/0006809 A1* | 1/2007 | Bradeen | A63J 7/00 |
| 2010/0236182 A1 | 9/2010 | Mackenzie | |
| 2013/0061809 A1 | 3/2013 | Jenkins | |
| 2014/0259567 A1 | 9/2014 | Colak et al. | |
| 2015/0059220 A1 | 3/2015 | Lim | |
| 2017/0208923 A1* | 7/2017 | Buechner | F16B 1/00 |
| 2019/0017652 A1 | 1/2019 | Hossain et al. | |
| 2019/0150542 A1* | 5/2019 | Rougieri | A63J 7/00 |

* cited by examiner

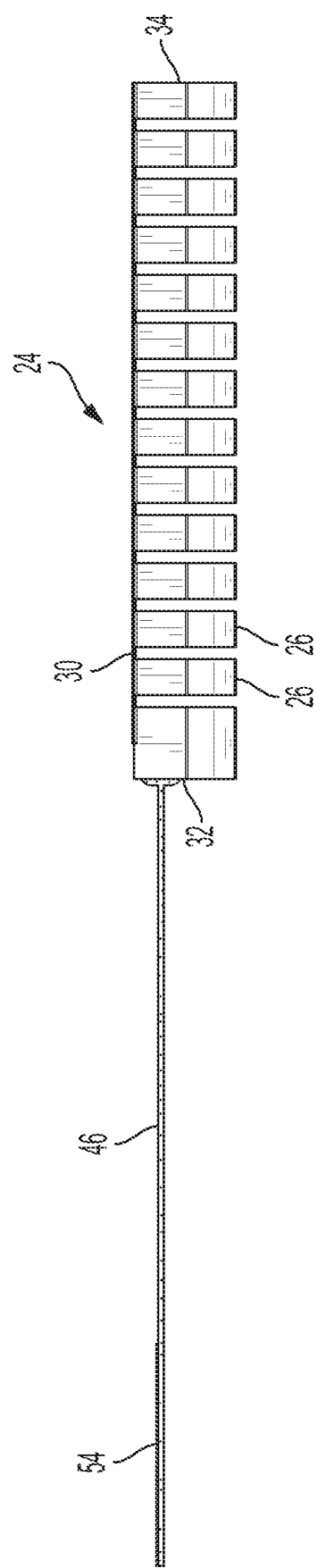

BAFFLE ASSEMBLY FOR POLE

FIELD OF THE INVENTION

The invention relates to baffles for a pole.

BACKGROUND OF THE INVENTION

Baffles may be utilized on a pole to prevent animals such as squirrels from climbing the pole to gain access to a birdfeeder. There are many prior art birdfeeders that include baffles in their design. However, the known baffles are typically designed for mounting in a specific manner, such as on a pole of specified diameter.

It is therefore desirable to have a baffle that may be utilized on poles of various diameters and that is easily mounted to a pole by a user.

SUMMARY OF THE INVENTION

In one aspect, there is disclosed a baffle assembly for a pole that includes a clamping structure adapted to be positioned about a pole. The clamping structure includes a plurality of laterally spaced mounting hooks removably joined along the longitudinal axis. The plurality of laterally spaced mounting hooks extends from a proximal end to a distal end defining a length of the clamping structure. A mounting strap includes a first end attached to the proximal end of the plurality of laterally spaced mounting hooks. The mounting strap extends to a second end and includes a fastener formed thereon. Bell housing includes opposing open ends. The bell housing is positioned about the pole and about the clamping structure wherein the bell housing is supported by the mounting hooks. The length of the clamping structure is adjusted by removal of selected mounting hooks of the plurality of laterally spaced mounting hooks from the distal end.

In another aspect, there is disclosed a baffle assembly for a pole that includes a clamping structure adapted to be positioned about a pole. The clamping structure includes a plurality of laterally spaced mounting hooks. The mounting hooks include a web material formed along the longitudinal axis between adjacent mounting hooks of the plurality of laterally spaced mounting hooks removably joining the adjacent mounting hooks along the longitudinal axis. The plurality of laterally spaced mounting hooks extend from a proximal end to a distal end defining a length of the clamping structure. A mounting strap includes a first end attached to the proximal end of the plurality of laterally spaced mounting hooks. The mounting strap extends to a second end and includes a fastener formed thereon. Bell housing includes opposing open ends. The bell housing is positioned about the pole and about the clamping structure wherein the bell housing is supported by the mounting hooks. The length of the clamping structure is adjusted by removal of selected mounting hooks of the plurality of laterally spaced mounting hooks from the distal end.

In a further aspect, there is disclosed a baffle assembly for a pole that includes a clamping structure adapted to be positioned about a pole. The clamping structure includes a plurality of laterally spaced mounting hooks removably joined along the longitudinal axis. Each of the plurality of laterally spaced mounting hooks includes a shank extending to a hooked body which includes a mounting surface extending to an angled face. The plurality of laterally spaced mounting hooks extends from a proximal end to a distal end defining a length of the clamping structure. A mounting strap includes a first end attached to the proximal end of the plurality of laterally spaced mounting hooks. The mounting strap extends to a second end and includes a fastener formed thereon. Bell housing includes opposing open ends. The bell housing is positioned about the pole and about the clamping structure wherein the bell housing is supported by the mounting hooks. The length of the clamping structure is adjusted by removal of selected mounting hooks of the plurality of laterally spaced mounting hooks from the distal end.

BRIEF DESCRIPTION OF THE DRAWINGS

FIG. 5 is a top view of a clamping structure.

DETAILED DESCRIPTION OF THE PREFERRED EMBODIMENTS

Figure 1:
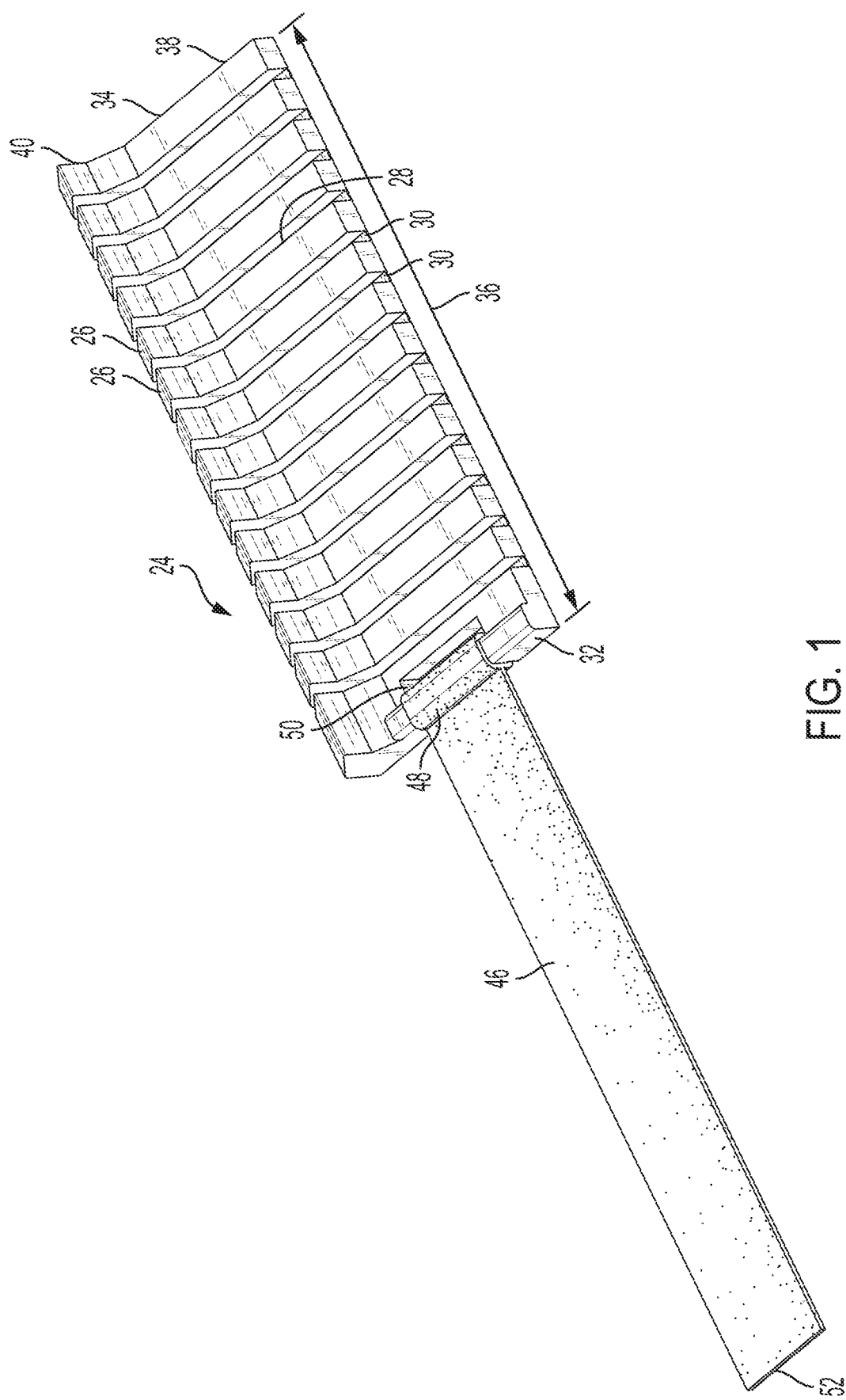
FIG. 1 is a perspective view of a clamping structure.
Figure 2:
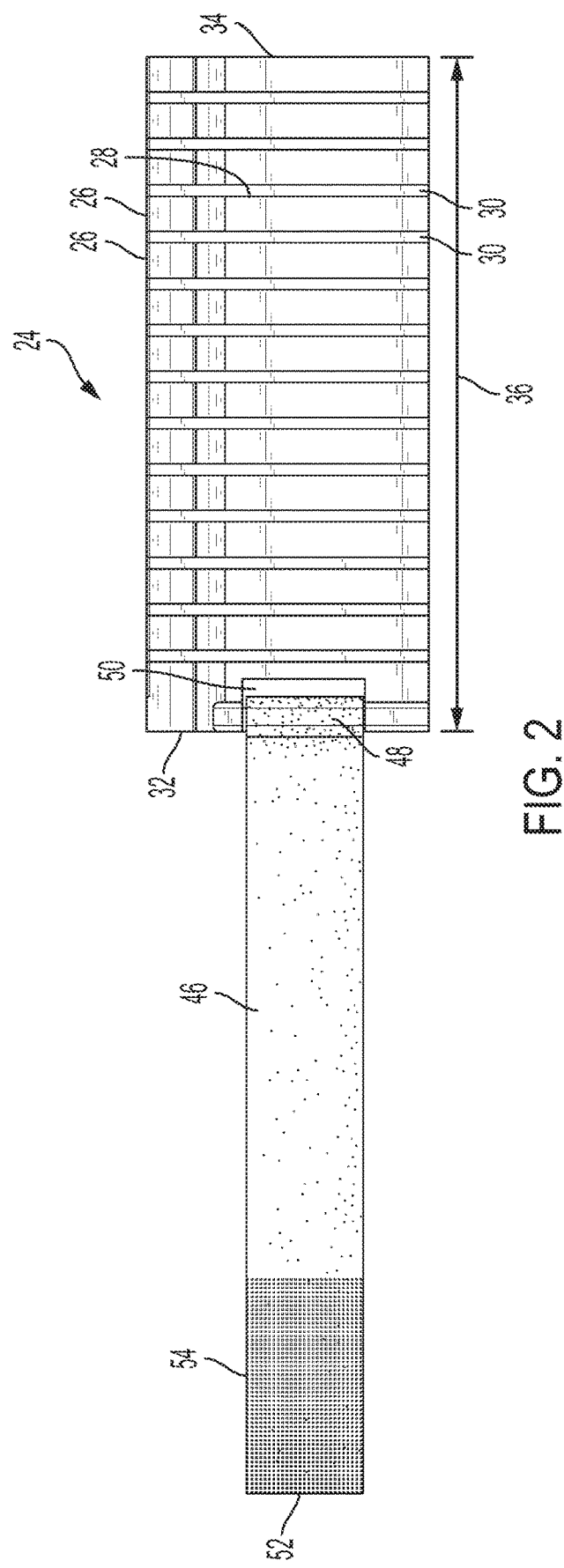
FIG. 2 is a front view of a clamping structure.
Figure 4:
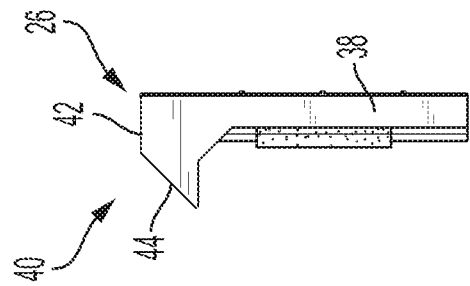
FIG. 4 is an end view of a clamping structure.
Figure 3:
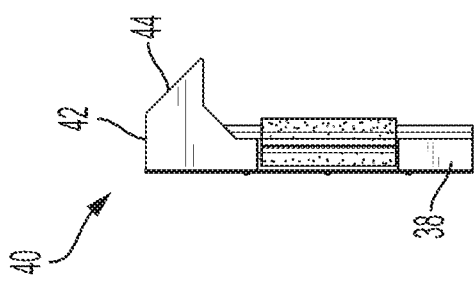
FIG. 3 is an end view of a clamping structure.

Referring to FIGS. 1-8, there is shown a baffle assembly 20 for a pole 22. The baffle assembly 20 includes a clamping structure 24 adapted to be positioned about the pole 22. The clamping structure 24 includes a plurality of laterally spaced mounting hooks 26 removably joined along the longitudinal axis 28. In one aspect, a web material 30 is formed along the longitudinal axis 28 between adjacent mounting hooks 26 of the plurality of laterally spaced mounting hooks 26 joining the adjacent mounting hooks 26. The plurality of laterally spaced mounting hooks 26 extend from a proximal end 32 to a distal end 34 defining a length 36 of the clamping structure 24. The length 36 of the clamping structure may be adjusted by removal of selected mounting hooks of the plurality of laterally spaced mounting hooks 26 from the distal end 34, as will be discussed in more detail below. The plurality of laterally spaced mounting hooks 26 may be formed of rubber material.

Each of the plurality of laterally spaced mounting hooks 26 include a shank 38 extending to a hooked body 40. The hooked body 40 includes a mounting surface 42 extending to an angled face 44.

A mounting strap 46 includes a first end 48 attached to the proximal end 32 of the plurality of laterally spaced mounting hooks 26. In one aspect, the mounting hook 26 at the proximal end 32 includes an attachment slot 50 formed therein for attaching the first end 48 of the mounting strap 46. The mounting strap 46 extends to a second end 52 that includes a fastener 54 formed thereon. In one aspect, the fastener 54 is a hook and loop fastener that removably attaches to the mounting strap 46.

A bell housing 56 includes opposing open ends 58, 60. The open end of the bell housing proximate the clamping structure has an opening size less than a length of the hooked body. The bell housing 56 is positioned about the pole 22 and about the clamping structure 24 such that the bell housing 56 is supported by the mounting hooks 26. In one aspect, the bell housing 56 includes a two-piece housing including first and second halves 62 that may be joined together about the pole 22. In one aspect, the first and second halves 62 may include bayonet pins and slots (not shown) formed on the edges to align the first and second halves 62 when assembled. The bell housing 56 may be formed of a rigid plastic material such as polypropylene. A metal ring 63 may be attached to the end 60 of the bell housing 56 that is spaced from the hooked body 40 of the clamping structure 24. The metal ring 63 may prevent damage to the bell housing 56 by chewing from an animal.

The bell housing 56 includes separated inner and outer surfaces 64, 66. The outer surface 66 includes a groove 68 formed therein about a circumference of the bell housing 56. A slot 70 is formed in the groove 68. A snap ring 72 is disposed in the groove 68 and includes a first attachment end 74 engaging one end of the slot 70 and a second attachment end 76 engaging an opposing end of the slot 70. The snap ring 72 compresses the first and second halves 62 together.

Figure 6:
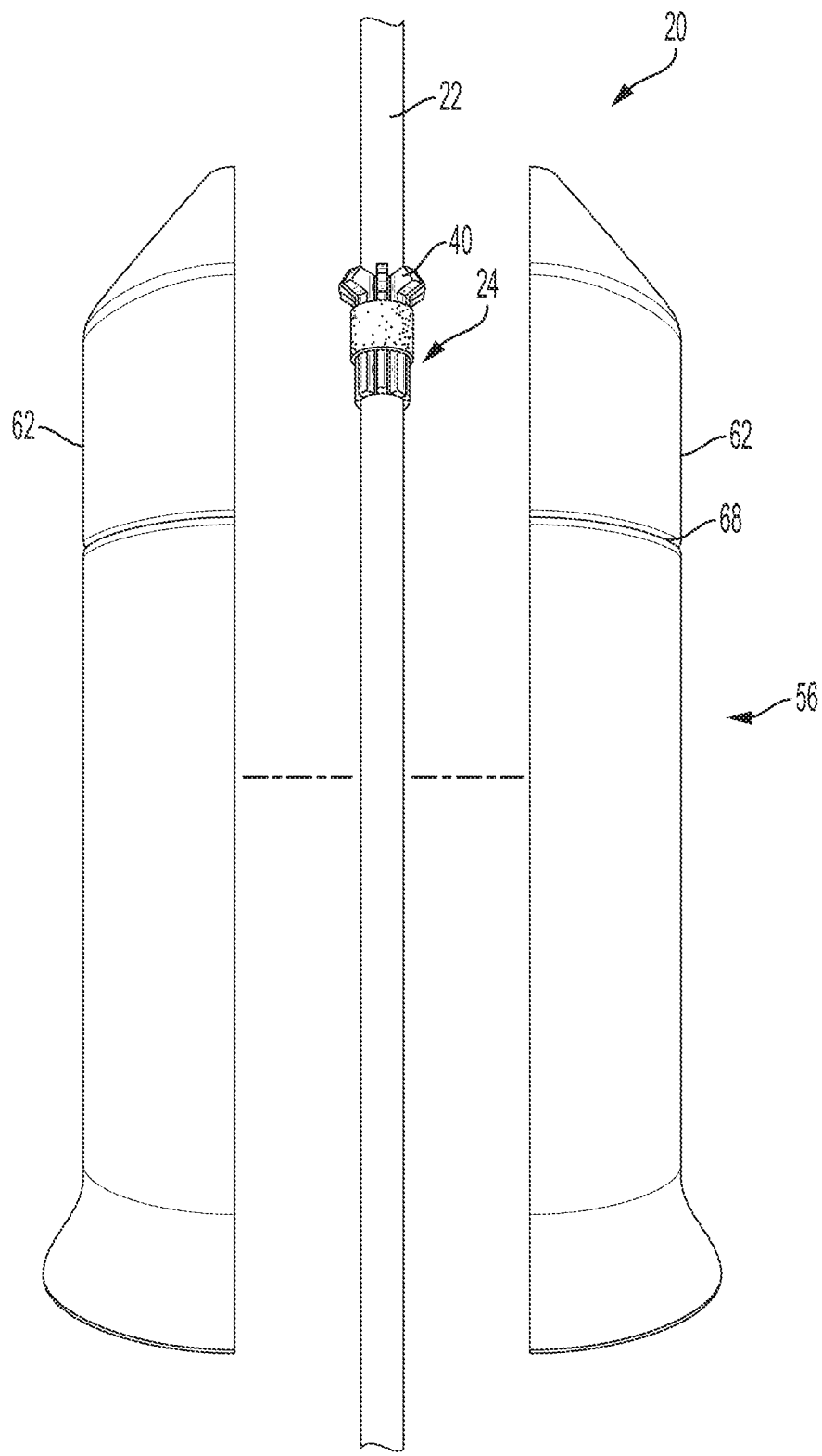
FIG. 6 is an exploded perspective view of a clamping structure, pole and bell housing.
Figure 7:
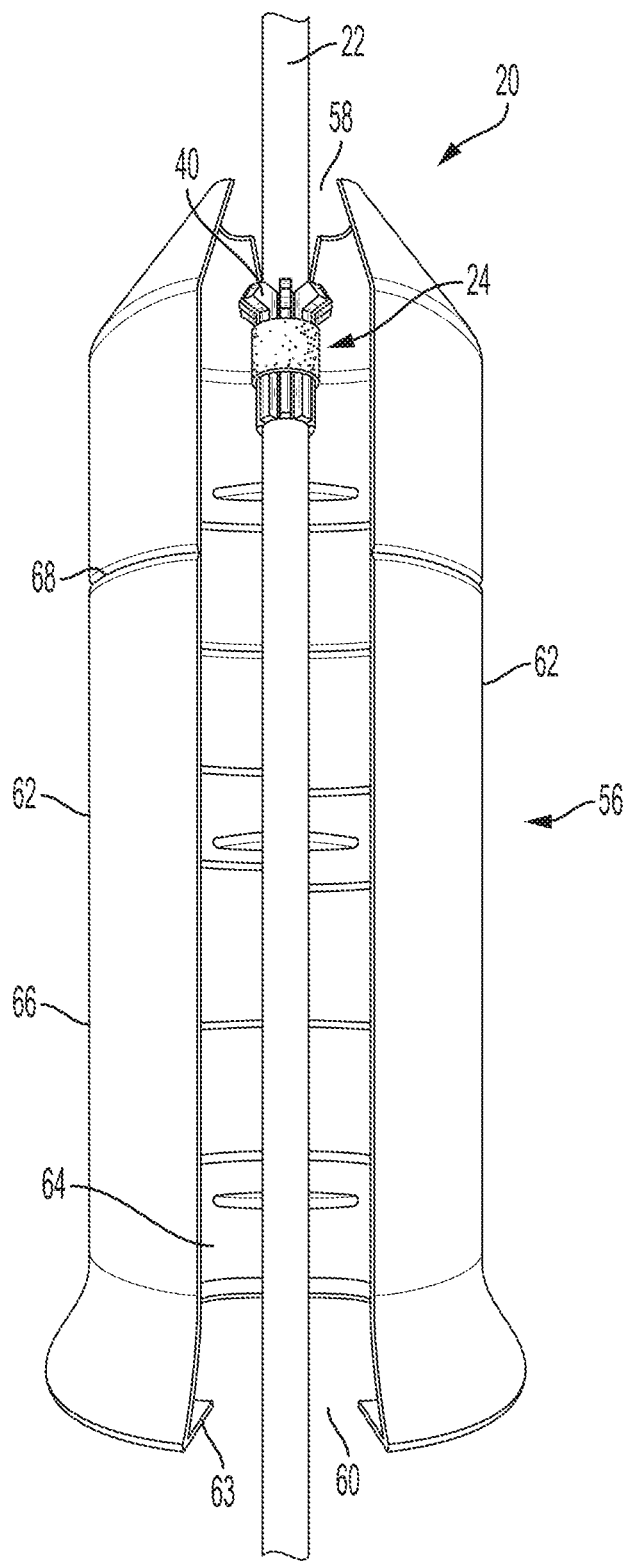
FIG. 7 is an exploded perspective view of a clamping structure, pole and bell housing.

In use, a user may wrap the clamping structure 24 about the pole 22 at a desired height along the pole 22. The clamping structure 24 is wrapped about the pole 22 such that the shanks 38 of the laterally spaced mounting hooks 26 abut the pole 22 with the hooked body 40 facing away from the pole 22, as shown in FIGS. 6-7. The clamping structure 24 may be used with various diameter poles. The user may adjust the length of the clamping structure 24 by removal of selected mounting hooks 26 of the plurality of laterally spaced mounting hooks 26 from the distal end 34. In this manner, the mounting hooks 26 will be spaced about the circumference of various diameter poles 22. In one aspect, the user may separate the selected mounting hooks 26 along the web 30 of material between adjacent mounting hooks 26.

After the clamping structure 24 is wrapped about the pole 22 with the desired length, the mounting strap 46 is wrapped about the plurality of laterally spaced mounting hooks 26. The mounting strap 46 is secured to itself using the fastener 54 as described above. The mounting hooks 26 are now secured to the pole 22 at a desired height.

Figure 8:
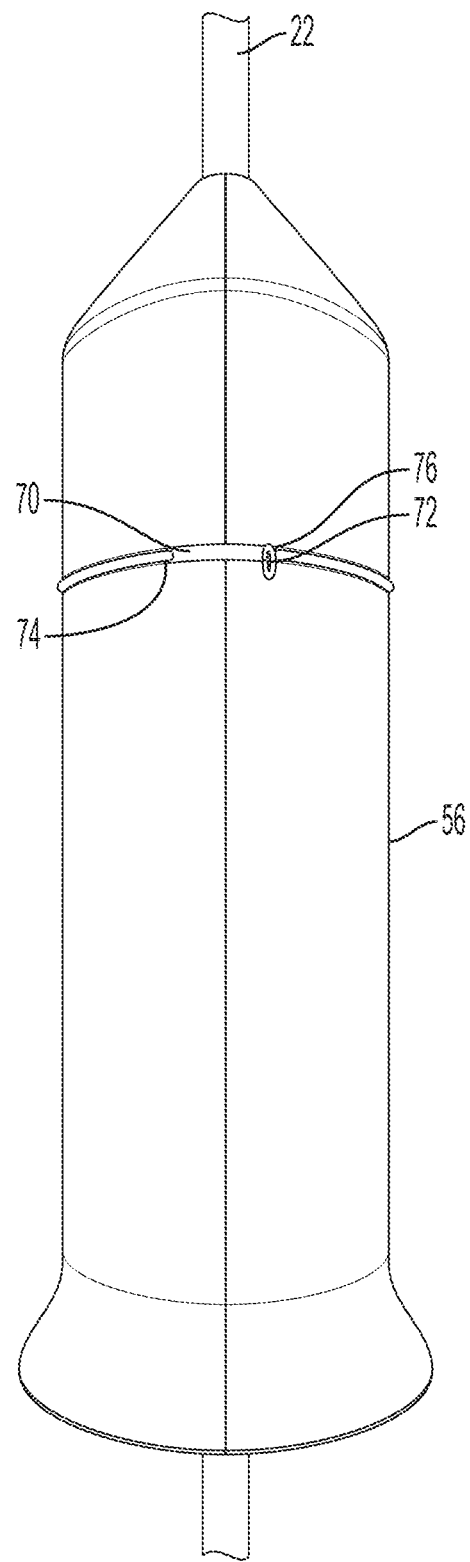
FIG. 8 is a perspective view of a clamping structure, pole and bell housing.

Next, the bell housing 56 including first and second halves 62 are joined together about the pole 22, such that the inner surface 64 of the bell housing 56 sits on the mounting hooks 26. The snap ring 72 is positioned in the groove 68 such that the first attachment end 74 engages one end of the slot 70 and a second attachment end 76 engages an opposing end of the slot 70. The snap ring 72 compresses the first and second halves 62 together as shown in FIG. 8.

The contact of the mounting hooks 26 is variable with the inner surface 64 of the bell housing 56 due to the structure of the hooked body 40 including a mounting surface 42 extending to an angled face 44. The angled face 44 allows the bell housing 56 to wobble when an animal attempts to climb on the baffle assembly 20.

The invention claimed is:

1. A baffle assembly for a pole comprising:
   a clamping structure adapted to be positioned about a pole, the clamping structure including a plurality of laterally spaced mounting hooks removably joined along a longitudinal axis, the plurality of laterally spaced mounting hooks extending from a proximal end to a distal end defining a length of the clamping structure;
   a mounting strap including a first end attached to the proximal end of the plurality of laterally spaced mounting hooks, the mounting strap extending to a second end including a fastener formed thereon;
   a bell housing including opposing open ends, the bell housing positioned about the pole and about the clamping structure wherein the bell housing is supported by the mounting hooks;
   wherein the length of the clamping structure is adjusted by removal of selected mounting hooks of the plurality of laterally spaced mounting hooks from the distal end.

2. The baffle assembly of claim 1 including a web material formed along the longitudinal axis between adjacent mounting hooks of the plurality of laterally spaced mounting hooks joining the adjacent mounting hooks.

3. The baffle assembly of claim 1 wherein each of the plurality of laterally spaced mounting hooks include a shank extending to a hooked body.

4. The baffle assembly of claim 3 wherein the hooked body includes a mounting surface extending to an angled face.

5. The baffle assembly of claim 1 wherein the plurality of laterally spaced mounting hooks is formed of rubber material.

6. The baffle assembly of claim 1 wherein the fastener is a hook and loop fastener.

7. The baffle assembly of claim 1 wherein the bell housing includes a two-piece housing.

8. The baffle assembly of claim 3 wherein the open end of the bell housing proximate the clamping structure has an opening size less than a length of the hooked body.

9. The baffle assembly of claim 1 wherein the bell housing includes separated inner and outer surfaces, the outer surface including a groove formed therein about a circumference of the housing.

10. The baffle assembly of claim 8 including a slot formed in the groove and including a snap ring disposed in the groove, the snap ring including a first attachment end engaging one end of the slot and a second attachment end engaging an opposing end of the slot.

11. The baffle assembly of claim 1 further including a metal ring attached to the end of the bell housing that is spaced from the hooked body of the clamping structure.

12. A baffle assembly for a pole comprising:
   a clamping structure adapted to be positioned about a pole, the clamping structure including a plurality of laterally spaced mounting hooks, the mounting hooks including a web material formed along the longitudinal axis between adjacent mounting hooks of the plurality of laterally spaced mounting hooks removably joining the adjacent mounting hooks along the longitudinal axis, the plurality of laterally spaced mounting hooks extending from a proximal end to a distal end defining a length of the clamping structure;
   a mounting strap including a first end attached to the proximal end of the plurality of laterally spaced mounting hooks, the mounting strap extending to a second end including a fastener formed thereon;
   a bell housing including opposing open ends, the bell housing positioned about the pole and about the clamping structure wherein the bell housing is supported by the mounting hooks;
   wherein the length of the clamping structure is adjusted by removal of selected mounting hooks of the plurality of laterally spaced mounting hooks from the distal end.

13. The baffle assembly of claim 12 wherein the plurality of laterally spaced mounting hooks is formed of rubber material.

14. The baffle assembly of claim 12 wherein the fastener is a hook and loop fastener.

15. The baffle assembly of claim 12 wherein the bell housing includes separated inner and outer surfaces, the outer surface including a groove formed therein about a circumference of the housing and including a slot formed in the groove and including a snap ring disposed in the groove, the snap ring including a first attachment end engaging one end of the slot and a second attachment end engaging an opposing end of the slot.

16. The baffle assembly of claim 12 wherein each of the plurality of laterally spaced mounting hooks include a shank extending to a hooked body.

17. The baffle assembly of claim 16 wherein the hooked body includes a mounting surface extending to an angled face.

18. A baffle assembly for a pole comprising:
- a clamping structure adapted to be positioned about a pole, the clamping structure including a plurality of laterally spaced mounting hooks wherein each of the plurality of laterally spaced mounting hooks include a shank extending to a hooked body which includes a mounting surface extending to an angled face, the plurality of laterally spaced mounting hooks removably joined along the longitudinal axis, the plurality of laterally spaced mounting hooks extending from a proximal end to a distal end defining a length of the clamping structure;
- a mounting strap including a first end attached to the proximal end of the plurality of laterally spaced mounting hooks, the mounting strap extending to a second end including a fastener formed thereon;
- a bell housing including opposing open ends, the bell housing positioned about the pole and about the clamping structure wherein the bell housing is supported by the mounting hooks;
- wherein the length of the clamping structure is adjusted by removal of selected mounting hooks of the plurality of laterally spaced mounting hooks from the distal end.

19. The baffle assembly of claim 18 including a web material formed along the longitudinal axis between adjacent mounting hooks of the plurality of laterally spaced mounting hooks joining the adjacent mounting hooks.

20. The baffle assembly of claim 1, wherein the distal end of the clamping structure is opposite the proximal end of the clamping structure.

* * * * *